United States Patent
Sampe et al.

(10) Patent No.: US 7,460,810 B2
(45) Date of Patent: Dec. 2, 2008

(54) IMAGE FORMING APPARATUS HAVING A CLEANING ROLLER FOR A CHARGING ROLLER OF THE APPARATUS

(75) Inventors: Atsushi Sampe, Kanagawa-ken (JP); Yoshiyuki Kimura, Tokyo-to (JP); Hiroyuki Nagashima, Kanagawa-ken (JP); Hiroshi Hosokawa, Kanagawa-ken (JP); Wakako Murakami, Tokyo-to (JP); Nobuo Kuwabara, Kanagawa-ken (JP)

(73) Assignee: Ricoh Co., Ltd., Tokyo (JP)

( * ) Notice: Subject to any disclaimer, the term of this patent is extended or adjusted under 35 U.S.C. 154(b) by 251 days.

(21) Appl. No.: 11/287,291

(22) Filed: Nov. 28, 2005

(65) Prior Publication Data

US 2006/0115292 A1    Jun. 1, 2006

(30) Foreign Application Priority Data

Nov. 26, 2004    (JP) .............................. 2004-341903

(51) Int. Cl.
    *G03G 15/02* (2006.01)
(52) U.S. Cl. ..................................... 399/100
(58) Field of Classification Search ................. 399/168, 399/100, 176, 170
    See application file for complete search history.

(56) References Cited

U.S. PATENT DOCUMENTS 5,638,158 A    6/1997  Sampe et al.

2002/0051665 A1 *  5/2002  Seto et al. .................... 399/388
2004/0213597 A1 * 10/2004  Yanagida et al. ............ 399/100
2005/0191081 A1 *  9/2005  Muraishi et al. ............ 399/100
2006/0115292 A1    6/2006  Sampe et al.

FOREIGN PATENT DOCUMENTS

JP          08095351 A  *  4/1996
JP          2002-169327    6/2002

OTHER PUBLICATIONS

U.S. Appl. No. 11/517,390, filed Sep. 8, 2006, Shimojo et al.
U.S. Appl. No. 11/856,304, filed Sep. 17, 2007, Oshige et al.

* cited by examiner

*Primary Examiner*—Quana M Grainger
(74) *Attorney, Agent, or Firm*—Oblon, Spivak, McClelland, Maier & Neustadt, P.C.

(57) ABSTRACT

An image forming apparatus includes an image carrying member, a charging roller for charging the image carrying member, a charging roller cleaning roller, and first and second shaft bearings. The charging roller cleaning roller contacts and cleans a surface of the charging roller. The first shaft bearing rotatably holds a rotation shaft of the charging roller cleaning roller, while the second shaft bearing rotatably holds a rotation shaft of the charging roller. The second shaft bearing integrally includes a first shaft bearing holding member which movably holds, by use of a resilient member, the first shaft bearing in a direction of moving the charging roller towards and apart from the charging roller cleaning roller.

38 Claims, 10 Drawing Sheets

IMAGE FORMING APPARATUS HAVING A CLEANING ROLLER FOR A CHARGING ROLLER OF THE APPARATUS

CROSS REFERENCE TO RELATED APPLICATION

This application claims priority to Japanese patent application no. 2004-341903 filed on Nov. 26, 2004, the entire contents of which are hereby incorporated by reference herein.

BACKGROUND OF THE INVENTION

1. Field of the Invention

The present invention relates to-an image forming apparatus for forming an image according to an electrographic process, such as a copier, a printer, and a facsimile machine. The present invention further relates to a process cartridge used in the image forming apparatus.

2. Discussion of the Background Art

As a charging device used in the image forming apparatus according to the electrographic process, there is known a contact-type charging roller which contacts to charge a surface of an image carrying member, such as a photoconductor. According to the contact-type charging roller, foreign materials such as toner left unremoved after transferring operations and paper particles originating from transfer sheets, which are generated from a long time use of the image forming apparatus, escape from a photoconductor cleaning device and adhere to a surface of the charging roller. Also, paper particles, toner, dust, and so forth floating inside the image forming apparatus gradually adhere to the surface of the charging roller. Such foreign materials adhered to the surface of the charging roller changes the resistance value of the charging roller. In some cases, therefore, an abnormal image is formed due to defective charging, such as uneven charging and insufficient charging.

There is also known a proximity-type charging roller which charges the surface of the photoconductor while keeping a minute gap of a few to dozens of microns with the surface of the photoconductor. The proximity-type charging roller is also subject to the change in resistance due to adhesion of the foreign materials to its surface caused over the long time use. In many cases, the proximity-type charging roller applies an AC (alternating current) voltage to the surface of the photoconductor to prevent the uneven charging. This application of the AC voltage, however, encourages adhesion of the foreign materials such as the paper particles, the toner, and the dusts floating in the image forming apparatus, to the charging roller. Therefore, similarly to the case of the contact-type charging roller, an abnormal image is formed due to defective charging, such as uneven charging and insufficient charging.

To remove the foreign materials adhered to the surface of the charging roller, there is known a charging roller provided with a charging roller cleaning member which rubs the surface of the charging roller and cleans the toner, the paper particles, and the like from the surface of the charging roller. For example, there is a charging roller cleaning roller which rubs the surface of a charging roller and cleans the toner, the paper particles, and the like from the surface of the charging roller, while being rotated along with rotation of the charging roller in contact with the surface of the charging roller. This type of charging roller cleaning roller has the advantage of higher durability, compared with a fixed charging roller cleaning member, such as a cleaning pad.

In this case, the charging roller is placed vertically above the photoconductor, and the charging roller cleaning roller is placed so as to contact the charging roller due to its own weight and to rotate along with the rotation of the charging roller. This arrangement of the charging roller cleaning roller is hereinafter referred to as upper arrangement.

Because of a spatial limit within the image forming apparatus, however, there is a case in which the charging roller cleaning roller contacts the surface of the charging roller at a position below a hypothetical horizontal plane including a rotation axis of the charging roller. In this case, the charging roller cleaning roller cannot contact the charging roller due to the weight thereof. In view of this, the charging roller cleaning roller is caused to contact the charging roller by predetermined pressure applied to a shaft thereof. In a background image forming apparatus, a transferring unit is placed vertically above photoconductors, while charging rollers are placed below the photoconductors. The charging roller cleaning rollers are provided vertically below the respective charging rollers. This arrangement of the charging roller cleaning rollers is hereinafter referred to as a lower arrangement. The lower arrangement, however, has the following disadvantage relating to the charging rollers and the charging roller cleaning rollers.

In this lower arrangement, the shaft of the charging roller cleaning roller is applied with the predetermined pressure such that the charging roller cleaning roller contacts the charging roller. Thus, extra loads are imposed on the charging roller and the charging roller cleaning roller, compared with the upper arrangement in which the charging roller cleaning roller contacts the charging roller due to the weight thereof. If the charging roller and the charging roller cleaning roller continue to be used for a long term under this state, the surface of either one of the charging roller and the charging roller cleaning roller is deteriorated. As a result, the charging roller cleaning roller fails to rotate along with the rotation of the charging roller, and thus cleaning operation of the charging roller cleaning roller becomes unstable, and cleaning performance of the charging roller cleaning roller is deteriorated. For example, the surface of the photoconductor is often coated with a lubricant to protect the surface of the photoconductor from possible hazard caused by the charging. If the lubricant adheres to the surface of the charging roller over time, the friction coefficient of a contact area where the charging roller contacts the charging roller cleaning roller substantially decreases, and the rotation of the charging roller cleaning roller along with the rotation of the charging roller becomes unstable. On the other hand, if the pressure applied for causing the charging roller cleaning roller to contact the charging roller is set to a relatively high value to maintain frictional force, the friction load on a shaft bearing increases, and the rotation of the charging roller cleaning roller is prevented. In particular, materials such as the lubricant and a toner additive easily adheres to the charging roller. Therefore, if the predetermined pressure applied to the shaft of the charging roller cleaning roller is increased, the charging roller cleaning roller rubs the materials onto the charging roller and causes filming of the materials. Thus, resistance of the surface of the charging roller becomes uneven. As a result, an abnormal image tends to be formed due to defective charging, such uneven charging and insufficient charging.

SUMMARY OF THE INVENTION

This patent specification describes an image forming apparatus. In one example, an image forming apparatus includes an image carrying member, a charging roller for charging the image carrying member, a charging roller cleaning roller for contacting and cleaning a surface of the charging roller, and first and second shaft bearings. The first shaft bearing is configured to rotatably hold a rotation shaft of the charging roller cleaning roller. The second shaft bearing is configured to rotatably hold a rotation shaft of the charging roller. The second shaft bearing integrally includes a first shaft-bearing holding member which is configured to movably hold, with use of a resilient member, the first shaft bearing in a direction of moving the charging roller close to and apart from the charging roller cleaning roller.

This patent specification further describes another image forming apparatus. In one example, another image forming apparatus includes image carrying means, charging means for charging the image carrying means, charge cleaning means for contacting and cleaning a surface of the charging means, and first and second shaft bearing means. The first shaft bearing means rotatably holds rotation shaft means of the charge cleaning means. The second shaft bearing means rotatably holds the rotation shaft means of the charging means. The second shaft bearing means integrally includes a first shaft bearing means holding means which movably holds, with use of resilient means, the first shaft bearing means in a direction of moving the charging means close to and apart from the charge cleaning means.

This patent specification further describes a process cartridge attachable to and detachable from an image forming apparatus. In one example, a process cartridge attachable to and detachable from an image forming apparatus includes an image carrying member, a charging roller for charging the image carrying member, a charging roller cleaning roller for contacting and cleaning a surface of the charging roller, and first and second shaft bearings. The first shaft bearing is configured to rotatably hold a rotation shaft of the charging roller cleaning roller. The second shaft bearing is configured to rotatably hold a rotation shaft of the charging roller. The second shaft bearing integrally includes a first shaft bearing holding member which is configured to movably hold, with use of a resilient member, the first shaft bearing in a direction of moving the charging roller close to and apart from the charging roller cleaning roller.

This patent specification further describes another process cartridge attachable to and detachable from an image forming apparatus. In one example, another image process cartridge attachable to and detachable from an image forming apparatus includes image carrying means, charging means for charging the image carrying means, charge cleaning means for contacting and cleaning a surface of the charging means, and first and second shaft bearing means. The first shaft bearing means rotatably holds the rotation shaft means of the charge cleaning means. The second shaft bearing means rotatably holds the rotation shaft means of the charging means. The second shaft bearing means integrally includes first shaft bearing means holding means which movably holds, with use of resilient means, the first shaft bearing means in a direction of moving the charging means close to and apart from the charge cleaning means.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein.

DETAILED DESCRIPTION OF THE INVENTION

Figure 1:
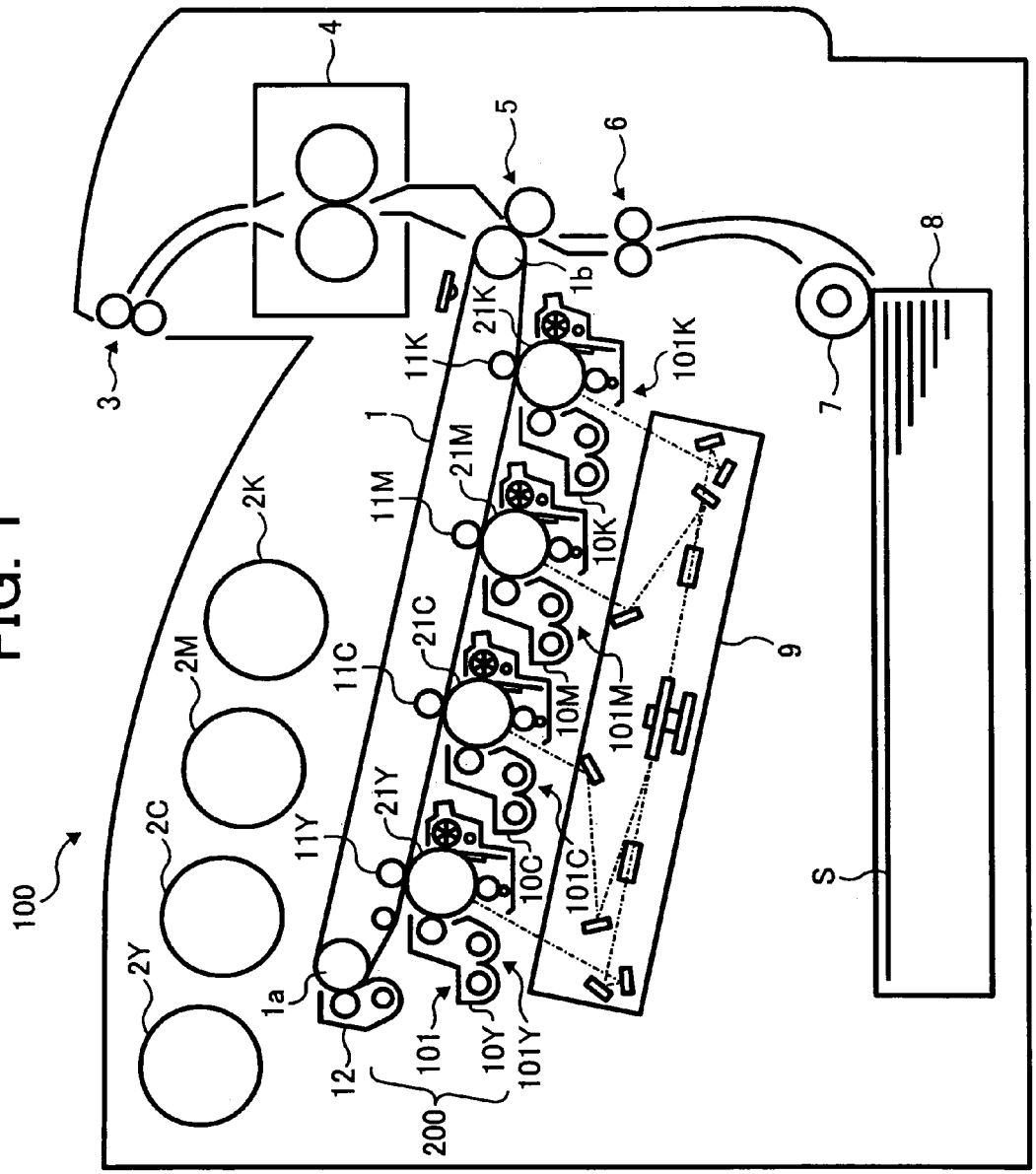
FIG. 1 is a schematic view of a configuration of an image forming apparatus according to an embodiment of the present invention.

In describing the embodiments illustrated in the drawings, specific terminology is employed for the purpose of clarity. However, the disclosure of this patent specification is not intended to be limited to the specific terminology so used, and it is to be understood that substitutions for each specific element can include any technical equivalents that operate in a similar manner. Referring now to the drawings, wherein like reference numerals designate identical or corresponding parts throughout the several views, particularly to FIG. 1, the configuration and operation of an image forming apparatus 100 according to an embodiment of the present invention are described.

FIG. 1 illustrates a sectional view of the image forming apparatus 100. The image forming apparatus 100 in the present example is a color laser printer. The image forming apparatus 100 includes a tandem-type image forming section 200, toner bottles 2Y, 2C, 2M, and 2K, an optical writing unit (i.e., a latent image forming device) 9, an intermediate transfer belt (i.e., an intermediate transfer member) 1, support rollers 1a and 1b, first transfer rollers (i.e., first transfer devices) 11X, 11C, 11M, and 11K, an intermediate transfer belt cleaning device 12, a fixing device 4, a second transfer roller (i.e., a second transfer device) 5, a resisting roller pair 6, a sheet-feeding roller 7, a sheet-feeding cassette B, and a sheet-discharging roller pair 3.

The tandem-type image forming section 200 includes four image forming units 101Y, 101C, 101M, and 101K arranged in this order from left to right in FIG. 1 for forming toner images of four colors, i.e., yellow (Y), cyan (C), magenta (M), and black (K)., respectively. An image forming unit 101 without any of the suffixes Y, C, M, and K is hereinafter used in a description of the image forming unit 101 where the distinction of the colors is not an issue. Similarly, the suffixes Y, C, M, and K are hereinafter omitted in a description of a member where the distinction of the colors is not an issue. The image forming unit 101 include a drum-shaped photoconductor (i.e., an image carrying member) 21 surrounded by such members as a charging roller (i.e., a charging device) 17 (illustrated in FIG. 2), a development device 10, a photoconductor cleaning device 30 (illustrated in FIG. 2).

The toner bottles 2Y, 2C, 2M, and 2K, which are supplied with a yellow toner, a cyan toner, a magenta toner, and a black toner, respectively, are provided in an upper part of the image forming apparatus 100. The toners of the respective colors contained in the toner bottles 2Y, 2C, 2M, and 2K are supplied to the corresponding development devices 10Y, 10C, 10M, and 10K by predetermined amounts through respective toner conveying paths (not illustrated).

The optical writing unit 9 is provided in a lower part of the image forming apparatus 100 and includes such members as a light source, a polygon mirror, an f-θ (theta) lens, and a reflection mirror. The thus configured optical writing unit 9 applies laser beams, according to image data, to surfaces of the respective photoconductors 21M, 21C, 21M, and 21K.

The intermediate transfer belt 1 formed into an endless belt is provided immediately above the tandem-type image forming section 200. The intermediate transfer belt 1 passes over the support rollers 1a and 1b. The support roller 1a is a drive roller having a rotation shaft (not illustrated) connected to a drive motor (not illustrated) which serves as a drive source. When the drive motor is operated, the intermediate transfer belt 1 rotates in a counterclockwise direction in FIG. 1, and the support roller 1b, which is a driven roller, is driven to rotate. On an inner surface of the intermediate transfer belt 1, the first transfer rollers 11Y, 11C, 11M, and 11K are provided to transfer toner images formed on the photoconductors 21Y, 21C, 21M, and 21K onto an outer surface of the intermediate transfer belt 1.

The second transfer roller 5 is provided at a downstream position of the first transfer rollers 11X, 11C, 11M, and 11K in a driving direction of the intermediate transfer belt 1. The support roller 1b is provided, as a pressure-applying member, to face the second transfer roller 5 via the intermediate transfer belt 1.

At downstream positions of the second transfer roller 5 in a moving direction of the recording medium S carrying thereon a toner image transferred by the second transfer roller 5, the fixing device 4 for fixing the toner image on the recording medium S and the sheet-discharging roller pair 3 are provided.

Operations of the image forming apparatus 100 are now described. As the photoconductor 21 in the image forming unit 101 rotates, the charging roller 17 uniformly charges the surface of the photoconductor 21. Then, the optical writing unit 9 applies laser beams to the surface of the photoconductor 21 to write image data thereon. As a result, an electrostatic latent image is formed on the surface of the photoconductor 21. Thereafter, toner is applied to the surface of the photoconductor 21 by the development device 10. This operation is performed in each of the image forming units 101Y, 101C, 101M, and 101K. Accordingly, respective electrostatic latent images are developed into visible images, i.e., single-color toner images of yellow, cyan, magenta, and black are formed on the surfaces of the photoconductors 21Y, 21C, 21M, and 21K. Further, the drive motor (not illustrated) drives to rotate the support roller 1a, and the other support roller 1b (i.e., the driven roller) and the second transfer roller 5 are driven to rotate. Thus, the intermediate transfer belt 1 is rotated, and the visible toner images formed on the surfaces of the photoconductors 21Y, 21C, 21M, and 21K are sequentially transferred onto the intermediate transfer belt 1 by the first transfer rollers 11Y, 11C, 11M, and 11K. As a result, a color composite image is formed on the intermediate transfer belt 1. After the toner images are transferred from the surfaces of the photoconductors 21Y, 21C, 21M, and 21K to the intermediate transfer belt 1, the photoconductor cleaning devices 30Y, 30C, 30M, and 30K clean the remaining toner from the surfaces of the photoconductors 21Y, 21C, 21M, and 21K in preparation for a next image forming operation.

With appropriate timing for the image forming operation, the sheet-feeding roller 7 pulls out a leading end of the recording medium S from the sheet-feeding cassette 8. Then, the recoiling medium S is conveyed to and stopped at the resisting roller pair 6, and then sent to a nip (i.e., a second transfer nip) formed between the second transfer roller 5 and the intermediate transfer belt 1 in appropriate timing for the image forming operation. The second transfer roller 5 performs a second transferring operation of transferring the toner image carried by the intermediate transfers belt 1 onto the recording medium S.

The recording medium S on which the toner image has been transferred is sent to the fixing device 4 and applied with heat and pressure so that the toner image is fixed on the recording medium S. Thereafter, the recording medium S is discharged to the outside of the image forming apparatus 100. Meanwhile, after the toner image has been transferred from the intermediate transfer belt 1 to the recording medium S, the intermediate transfer belt 1 is cleaned of toner remaining thereon by the intermediate transfer belt cleaning device 12 in preparation for a next image forming operation performed in the tandem-type image forming section 200.

The image forming units 101Y, 101O, 101M, and 101K are integrally-constructed process cartridges attachable to and detachable from the image forming apparatus 100. The image forming units 101Y, 101C, 101M, and 101K can be pulled toward a front side of the image forming apparatus 100 along a guide rail (not illustrated) fixed to the image forming apparatus 100. Further, the image forming units 101Y, 101C, 101M, and 101K can be pushed toward a back side of the image forming apparatus 100 to be installed at respective predetermined positions in the image forming apparatus 100.

Figure 2:
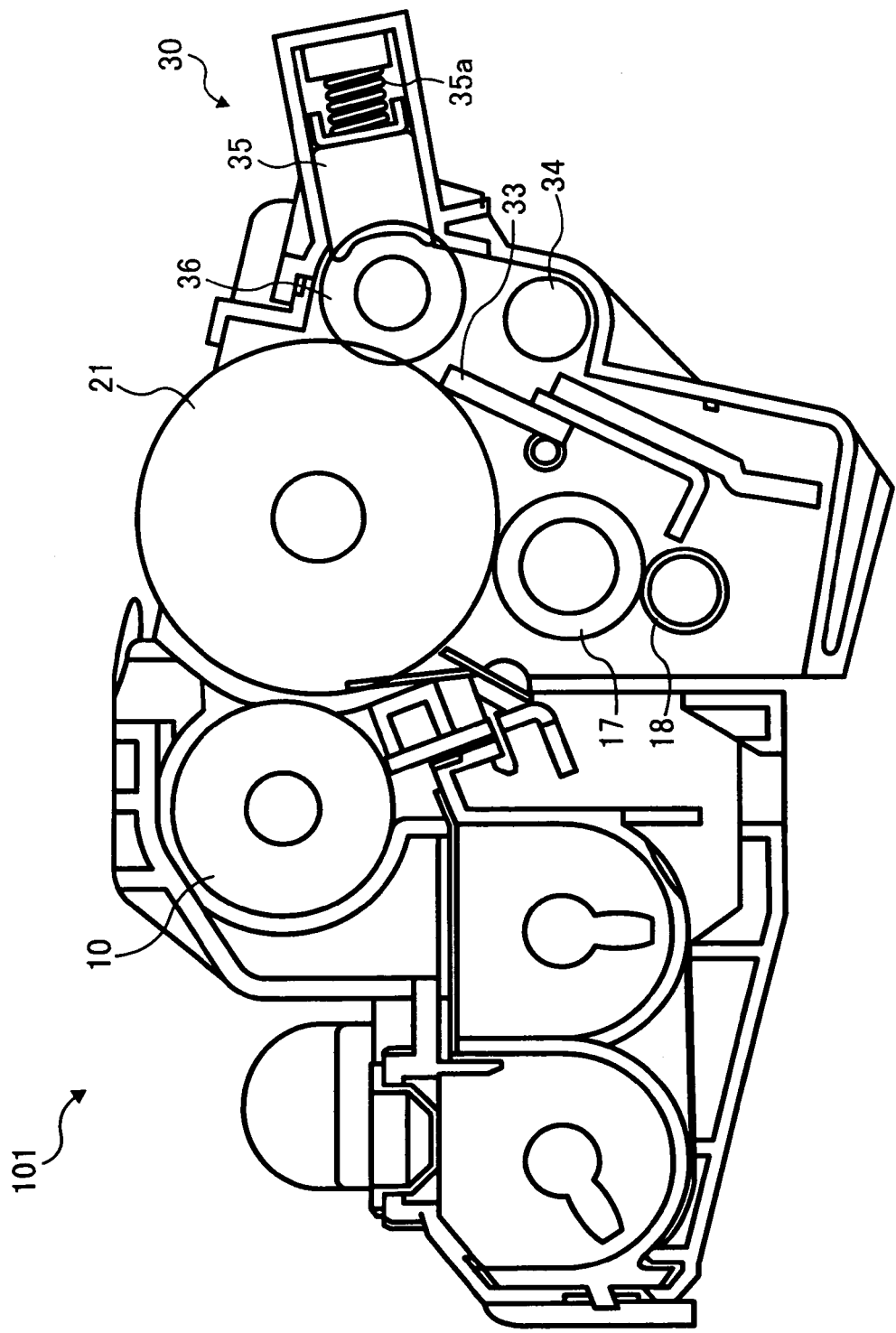
FIG. 2 is a schematic view of a configuration of a process cartridge, forming a toner image forming unit, included in the image forming apparatus illustrated in FIG. 1.

The image forming units 101Y, 101C, 101M, and 101K are similar in structure and operation. The image forming unit 101 is described more in detail with reference to FIG. 2. FIG. 2 is an enlarged view illustrating a schematic configuration of the image forming unit 101. The image forming unit 101 includes the photoconductor 21, the development device 10, charging roller 17, the charging roller cleaning roller 18, and the photoconductor cleaning device 30. The photoconductor 21 rotates in a clockwise direction in FIG. 2, and is sequentially surrounded by the development device 10, charging roller 17, and the photoconductor cleaning device 30. In the image forming apparatus 100 according to the present embodiment, the charging roller 17 is placed vertically below the photoconductor 21. Further, the charging roller cleaning roller 18 is provided below the charging roller 17 such that the charging roller cleaning roller 18 contacts the surface of the charging roller 17 and rotates along with rotation of the charging roller 17. Accordingly, the charging roller cleaning roller 18 cleans the surface of the charging roller 17. The photoconductor cleaning device 30 includes a cleaning blade 33, a waste-toner conveying coil 34, a solid Zinc stearate bar 35, a compressed spring 35a, and a fur brush 36. The waste-toner conveying coil 34 discharges waste toner scraped off from the surface of the photoconductor 21 to the outside of the image forming unit 101.

Figure 3A:
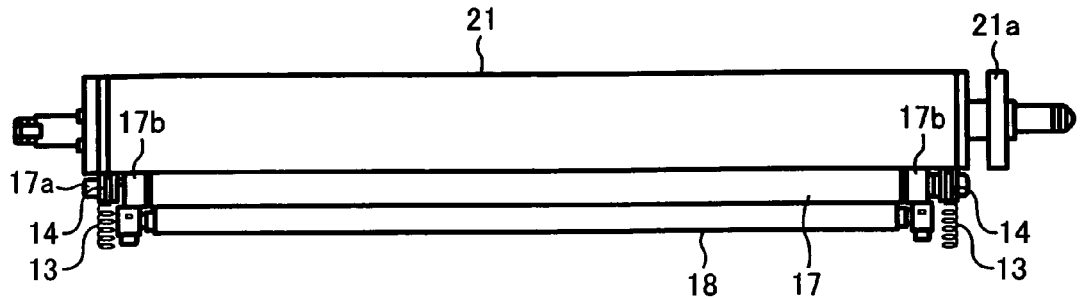
FIG. 3A is a front view of a photoconductor, a charging roller, and a charging roller cleaning roller included in the process cartridge illustrated in FIG. 2.
Figure 3B:
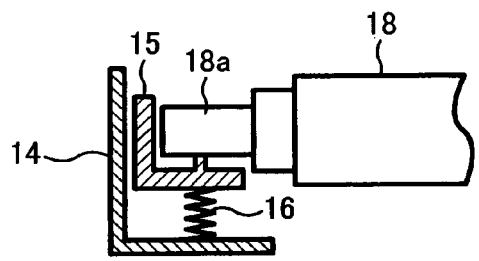
FIG. 3B is an enlarged sectional view of a shaft bearing of the charging roller cleaning roller illustrated in FIG. 3A.

FIG. 3A is a front view of the photoconductor 21, the charging roller 17, and the charging roller cleaning roller 18 according to an embodiment of the present invention. FIG. 3B is an enlarged sectional view of a shaft bearing 15 for the charging roller cleaning roller 18. Reference numbers 13 and 16 indicate springs, and a reference number 14 indicates a shaft bearing for the charging roller 17, which are latex described. The photoconductor 21 is formed by doping an aluminum tube with an organic photosensitive layer of approximately 30 mm in diameter. One end of the aluminum tube forming the photoconductor 21 is provided with a flange gear 21a which engages with a photoconductor drive gear (not illustrated) so that the photoconductor 21 rotates in the predetermined direction (i.e., the clockwise direction in FIG. 2). The photoconductor 21 and the charging roller 17 are adjacent each other, with a minute gap of approximately 10 μm to approximately 70 μm kept between the photoconductor 21 and the charging roller 17 by two gap rollers 17b provided on opposite ends of the charging roller 17.

The charging roller 17 is formed by surrounding a rotation shaft 17a with a resin layer made of a conductive material, such as an ABS (acrylonitrile-butadiene styrene)/polyetherester-amide. The resin layer has an electric resistance value of approximately $10^4 \Omega \cdot cm$ to approximately $10^6 \Omega \cdot cm$. The resin layer may be covered by a surface layer made of such material as ceramic/carbon. The rotation shaft 17a of the charging roller 17 is applied with a voltage by a power source (not illustrated) to uniformly charge the surface of the photoconductor 21. The voltage may be a DC (direct-current) voltage of approximately −500 volts to approximately −700 volts superposed with an AC voltage of approximately 1.8 kvp-p (kilovolts peak to peak) to approximately 2.5 kvp-p, for example.

The charging roller cleaning roller 18 is formed by surrounding a rotation shaft 18a with melamine resin foam compressed and reduced to approximately 20% to approximately 50% thereof. If the melamine resin foam is not compressed, a foam size of the melamine resin foam is too large to uniformly clean the surface of the charging roller 17. Therefore, the melamine resin foam is compressed as described above to uniformly clean the surface of the charging roller 17. Alternatively, the charging roller cleaning roller 18 may be covered with electrostatically flocked dividable microfibers. In the present example, each microfiber bristle has an average diameter of approximately 0.05 μm to approximately 20 μm and a length of approximately 0.5 mm to approximately 2 mm. Further, the entire length and an outer diameter of the charging roller cleaning roller 18 are set to be approximately 227 mm and approximately 8 mm, respectively, in the present example.

The fur brush 36 includes a conductive acrylic resin (e.g., a resin soled by Toray Co., Ltd. under the trademark SA-7). The fur brush 36 used in the present example has a conductive acrylic resin fiber having a denier value of approximately 6.25, and approximately 30,000 bristles are embedded in the fur brush 36. The fur brush 36 rotates in the counterclockwise direction in FIG. 2. In the present example, the fur brush 36 has an outer diameter of approximately 12 mm, and is pressed into the surface of the photoconductor 21 by a depth of approximately 1 mm. A linear velocity ratio of the fur brush 36 to the photoconductor 21 is set to be 1:1, when measured with the fur brush 36 being pressed into the surface of the photoconductor 21 by the depth of approximately 1 mm.

The cleaning blade 33 includes a polyurethane rubber having a rubber hardness value of approximately 65 degrees to approximately 75 degrees. The cleaning blade 33 protrudes by a length of approximately 7 mm to approximately 9 mm, and initially contacts the photoconductor 21 at an angle of approximately 15 degrees to approximately 20 degrees. Further, the cleaning blade 33 contacts the photoconductor 21 with a pressure of approximately 0.18 N/cm to approximately 0.30 N/cm.

To protect the surface of the photoconductor 21, a lubricant is applied to the surface of the photoconductor 21. In the present example, the surface of the photoconductor 21 is applied with the AC-superposed voltage by the charging roller 17. Thus, toner filming tends to occur on the surface of the photoconductor 21 due to hazard caused by the AC voltage. Therefore, coating of the surface of the photoconductor 21 with the lubricant is necessary. In the present example, zinc stearate (i.e., the solid Zinc stearate bar 35) is used as the lubricant. Pressed by the spring 35a, the solid Zinc stearate bar 35 applies pressure of approximately 200 mN to approximately 800 mN to two points of the fur brush 36. Accordingly, the surface of the photoconductor 21 is gradually applied with Zinc stearate by the fur brush 36.

Figure 4:
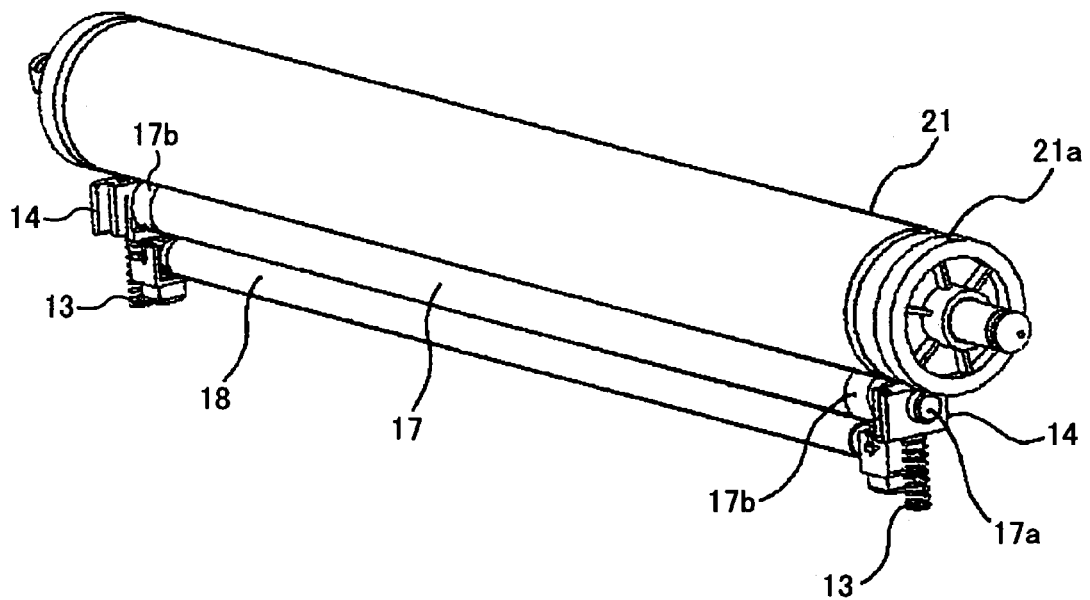
FIG. 4 is a schematic perspective view of the photoconductor, the charging roller, and the charging roller cleaning roller illustrated in FIG. 3A.

With reference to FIG. 4, pressure application mechanism of the charging roller 17 and the charging roller cleaning roller 18 is described. FIG. 4 is a perspective view illustrating schematic configurations of the photoconductor 21, the charging roller 17, and the charging roller cleaning roller 18. The shaft bearings 14 for the charging roller 17 rotatably hold the rotation shaft 17a of the charging roller 17. Further, each of the shaft bearings 14 is guided by a frame guide 24 (illustrated in FIG. 9) and pressed by the spring 13 to slidingly move in up-and-down directions. Thus configured, the charging roller 17 is moved to press the photoconductor 21 with a pressure of approximately 5 N to approximately 6 N at each of two points where the charging roller 17 contacts and presses the photoconductor 21. As described above, the opposite ends of the charging roller 17 are provided with the two gap rollers 17b each having an outer diameter larger than the diameter of the outer diameter of the charging roller 17 by approximately 30 μm to approximately 60 μm. Thus, the minute gap of approximately 10 μm to approximately 70 μm is maintained between the charging roller 17 and the photoconductor 21.

Figure 5:
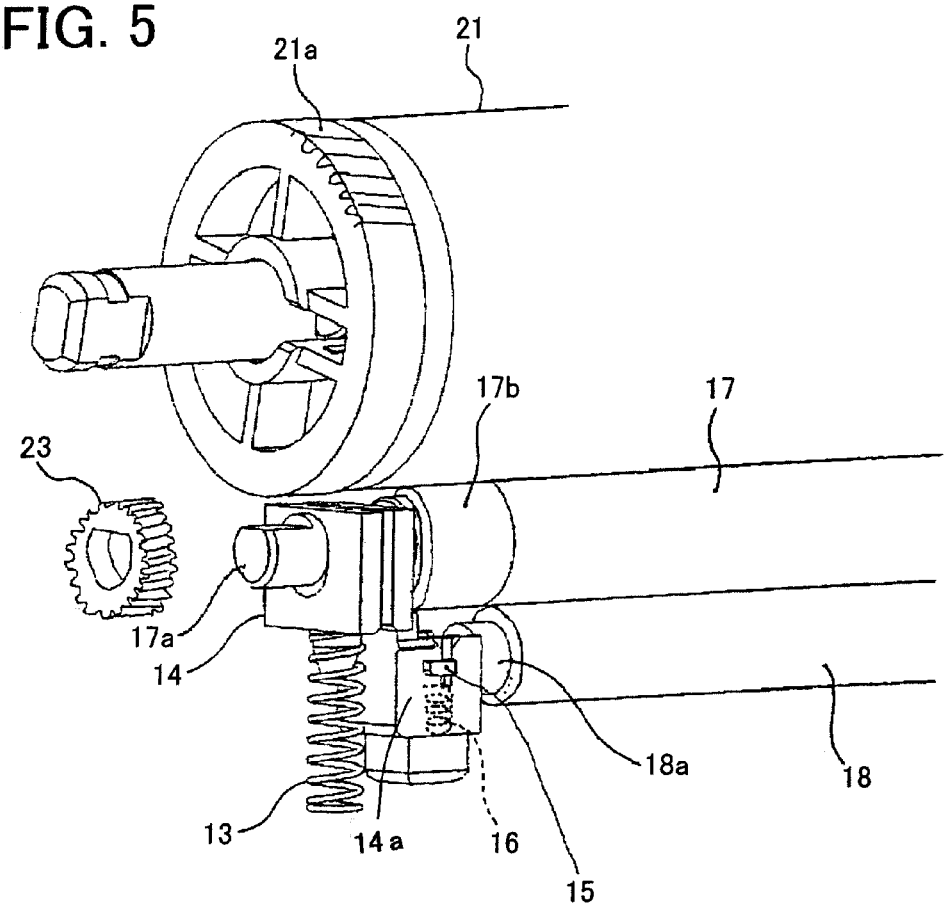
FIG. 5 is an enlarged perspective view of shaft bearings of the photoconductor, the charging roller, and the charging roller cleaning roller illustrated in FIG. 3A.
Figure 6:
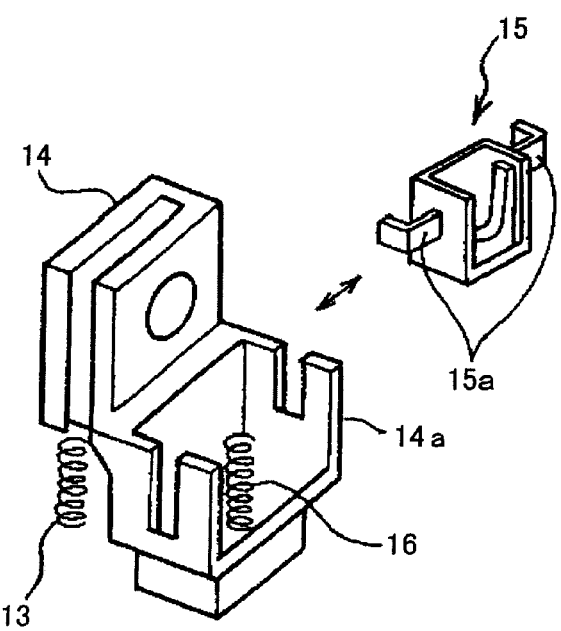
FIG. 6 is a diagram illustrating a configuration of the shaft bearing for a rotation shaft of the charging roller, the shaft bearing for a rotation shaft of the charging roller cleaning roller, and a spring illustrated in FIG. 5.

FIG. 5 is an enlarged perspective view illustrating one side of the photoconductor 21, the shaft bearing 14 for the charging roller 17, and the shaft bearing 15 for the charging roller cleaning roller 18. FIG. 6 illustrates structures of the shaft bearing 14 for the rotation shaft 17a of the charging roller 17, the shaft bearing 15 for the rotation shaft 18a of the charging roller cleaning roller 18, and the spring 16. Rotatably held by the shaft bearing 14, the rotation shaft 17a is driven by drive force received, via a gear 23, from the flange gear 21a of the photoconductor 21, and rotates at an equal speed to a rotation speed of the photoconductor 21. Meanwhile, the rotation shaft 18a of the charging roller cleaning roller 18 is rotatably held by the shaft bearing 15. The shaft bearing 14 extends vertically downward to function also as a member for holding the shaft bearing 15 for the charging roller cleaning roller 18. That is, the shaft bearing 14 for holding the rotation shaft 17a of the charging roller 17 integrally includes a portion 14a which holds the shaft bearing 15 for holding the rotation shaft 18a of the charging roller cleaning roller 18. As illustrated in FIG. 6, the shaft bearing 15 for the rotation shaft 18a of the charging roller cleaning roller 18 forms a nested box having two protruding ribs 15a. The thus configured shaft bearing 15 is held in the shaft bearing 14, with the two protruding ribs 15a hung on the shaft bearing 14. The spring 16 is a resilient member provided in a space between the shaft bearings 14 and 15. Thus, the shaft bearing 15 can slidingly move up and down with respect to the shaft bearing 14. The spring 16 causes the portion 14a of the shaft bearing 14 which holds the shaft bearing 15 to apply pressure of approximately 0.6 N to the shaft bearing 15 which rotatably holds the rotation shaft 18a. That is, the pressure of approximately 0.6 N is applied to each of the two shaft bearings 15 provided on the opposite ends of the rotation shaft 18a. Accordingly, pressure applied to the charging roller 17 by the charging roller cleaning roller 18 is set to be approximately 15 mN/cm to approximately 50 mN/cm (a load posed by the charging roller cleaning roller 18 itself is ignored). If the pressure is greater than approximately 50 mN/cm, an area of the compressed melamine resin foam of the charging roller cleaning roller 18 which applies the pressure to the charging roller 17 may be deformed. As a result, the charging roller cleaning roller 18 may stay deformed and thus fail to move and rotate along with the rotation of the charging roller 17. Further, a friction load posed by the rotation shaft 18a on the shaft bearing 15 increases, and rotation of the charging roller cleaning roller 18 along with the rotation of the charging roller 17 is deteriorated. On the other hand, if the pressure is smaller than approximately 50 mN/cm, roughness of the surface of the charging roller cleaning roller 18 causes the pressure to be unevenly applied to the surface of the charging roller 17. As a result, cleaning performance of the charging roller cleaning roller 18 is deteriorated. Further, if contact pressure with which the charging roller cleaning roller 18 contacts the charging roller 17 is too small, the charging roller cleaning roller 18 unstably contacts the charging roller 17, and thus it becomes difficult for the charging roller cleaning roller 18 to rotate along with the rotation of the charging roller 17. As a result, filming of such materials as minute toner particles may occur on the surface of the charging roller 17.

The surface of the photoconductor 21 is adhered with such materials as the toner, additive, and lubricant carried by the fur brush 36, the cleaning blade 33, and so forth included in the photoconductor cleaning device 30. Most of such particles pass through the minute gap formed between the photoconductor 21 and the charging roller 17. However, some of such particles fail to pass through the minute gap or are affected by the AC bias voltage applied to the charging roller 17, so that those particles adhere to the surface layer of the charging roller 17. While being rotated along with the rotation of the charging roller 17 by friction force caused by contact with the charging roller 17, the charging roller cleaning roller 18 cleans the surface of the charging roller 17 of those particles such as the toner particles adhered thereto. If the charging roller cleaning roller 18 is driven to rotate and rub the surface of the charging roller 17 with a difference in linear velocity being intentionally set between the charging roller 17 and the charging roller cleaning roller 18, the cleaning performance of the charging roller cleaning roller 18 deteriorates. Meanwhile, the toner-scraping ability of the charging roller cleaning roller 18 is relatively low, if the charging roller cleaning roller 18 is driven to rotate at a completely equal speed to the charging roller 17. On the other hand, when the charging roller cleaning roller 18 is not driven by some drive force but is rotated along with the rotation of the charging roller 17, the particles adhered to the surface layer of the charging roller 17 are not scrapped off but absorbed into foam cells of the charging roller cleaning roller 18. Thus, the cleaning performance of the charging roller cleaning roller 18 are relatively well kept over time.

A shaft-receiving area of the shaft bearing 15, which has the two ribs 15a each having a width of approximately 0.8 to 1.5 mm, receives a semi-circular end surface of the rotation shaft 18a. The semi-circular end surface of the rotation shaft 18a is approximately 4 mm in diameter. If the width of the rib of the shaft bearing 15 contacting the semi-circular end of the rotation shaft 18a is increased, friction resistance of the rotation shaft 18a also increases. As a result, the friction coefficient μ of the charging roller 17 and the charging roller cleaning roller 18 tends to decrease. Further, the shaft bearing 14 and 15 tend to be locked when a foreign material such as carrier and toner penetrates thereinto. The present inventors have discovered from examinations that a contact area where the shaft bearing 15 contacts one end of the rotation shaft 18a is preferably in the range of from approximately 3 mm$^2$ to approximately 20 mm$^2$. If the contact area exceeds approximately 20 mm$^2$, resistance of the charging roller cleaning roller 18 against the rotation of the charging roller 17 increases. On the other hand, if the contact area does not reach approximately 3 mm$^2$, the charging roller cleaning roller 18 does not effectively contact and rub the surface of the charging roller 17.

Figure 8:
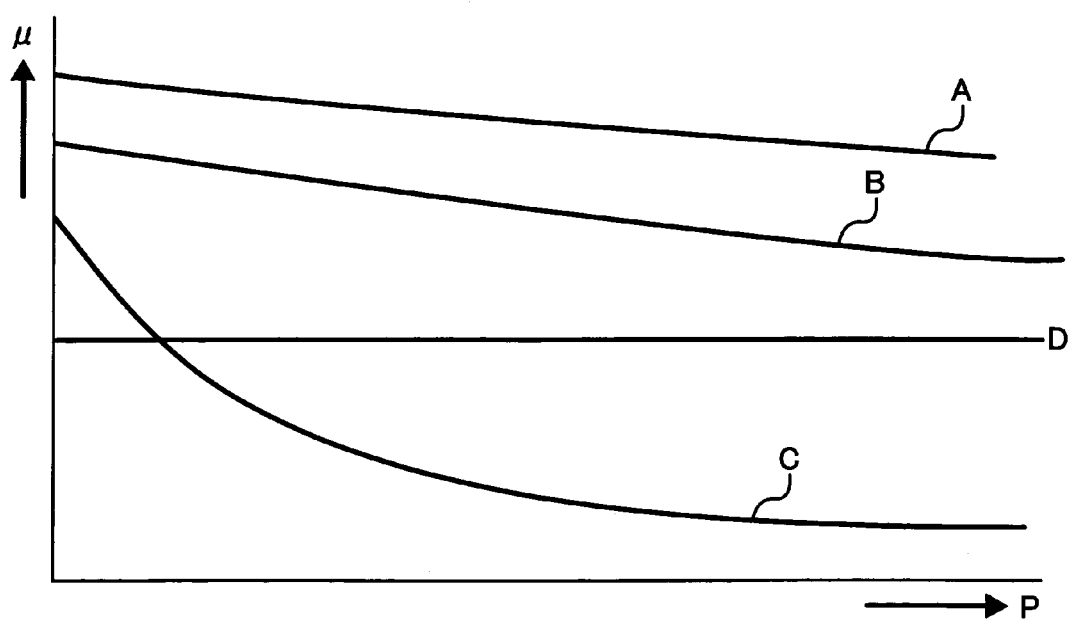
FIG. 8 is a graph illustrating a relationship between contact pressure P of a solid Zinc stearate bar onto a fur brush with a friction coefficient $\mu$ of the charging roller and the charging roller cleaning roller.

The material of the surface of the charging roller cleaning roller 18 is now described. As described above, when the lubricant is applied over the surface of the photoconductor 21, the lubricant moves from the photoconductor 21 to the charging roller 17 and further to the charging roller cleaning roller 18, and thus the friction coefficient of the charging roller 17 and the charging roller cleaning roller 18 may decrease. The graph in FIG. 8 indicates the relationship between contact pressure P and the friction coefficient μ, wherein the contact pressure P is a pressure with which the solid Zinc stearate bar 35 contacts the fur brush 36, and the friction coefficient μ represent friction coefficients of the charging roller 17 and the charging roller cleaning roller 18 measured after outputting 100,000 sheets of the recording medium S. In FIG. 8, reference letters A, B, and C respectively indicate the friction coefficients μ for the charging roller cleaning roller 18 having a surface made of melamine resin foam, the friction coefficients μ for the charging roller cleaning roller 18 having a surface made of microfibers derived from a dividable composite fiber, and the friction coefficients μ for the charging roller cleaning roller 18 having a surface made of a background fiber. D indicates a threshold value of the friction coefficients μ with which the charging roller cleaning roller 18 can rotate along with the rotation of the charging roller 17. That is, if the friction coefficients μ are lower than this threshold value D, the charging roller cleaning roller 18 does not appropriately rotate along with the rotation of the charging roller 17. As observed in FIG. 8, if the contact pressure P is increased, the amount of Zinc stearate applied over the surface of the photoconductor 21 is increased, and thus the Zinc stearate tends to move more to the charging roller 17. Therefore, the friction coefficient μ of the charging roller 17 and the charging roller cleaning roller 18 gradually decreases over time in most cases. A background charging roller cleaning roller uses, for example, an electrostatically-flocked brush (e.g., a bristle length of approximately 2 mm and a denier value of approximately 0.8 to approximately 2), or an brush made of insulating nylon, conductive nylon, or, conductive triacetate. Reference letter C in FIG. 8 indicates the friction coefficients μ for the charging roller cleaning roller 18 having a surface made of the background fiber. As observed in FIG. 8, as for the charging roller cleaning roller 18 having a surface made of the background fiber, if the pressure applied to the lubricant (i.e., the contact pressure P) is increased, the friction coefficient μ of the charging roller 17 and the charging roller cleaning roller 18 substantially decreases, and thus the charging roller cleaning roller 18 fails to rotate along with the rotation of the charging roller 17. As a result, such materials as minute toner particles and toner additives escaped from the solid Zinc stearate bar 35 and the cleaning blade 33 forms a film on the surface of the charging roller 17, and thus an abnormal image is formed. Meanwhile, in the present embodiment which uses the melamine resin foam or electrostatically flocked microfibers derived from the dividable composite microfiber, the decrease in the friction coefficient μ is relatively small, even if the contact pressure P is increased, and the charging roller cleaning roller 18 continues to stably rotate over time along with the rotation of the charging roller 17.

Figure 7:
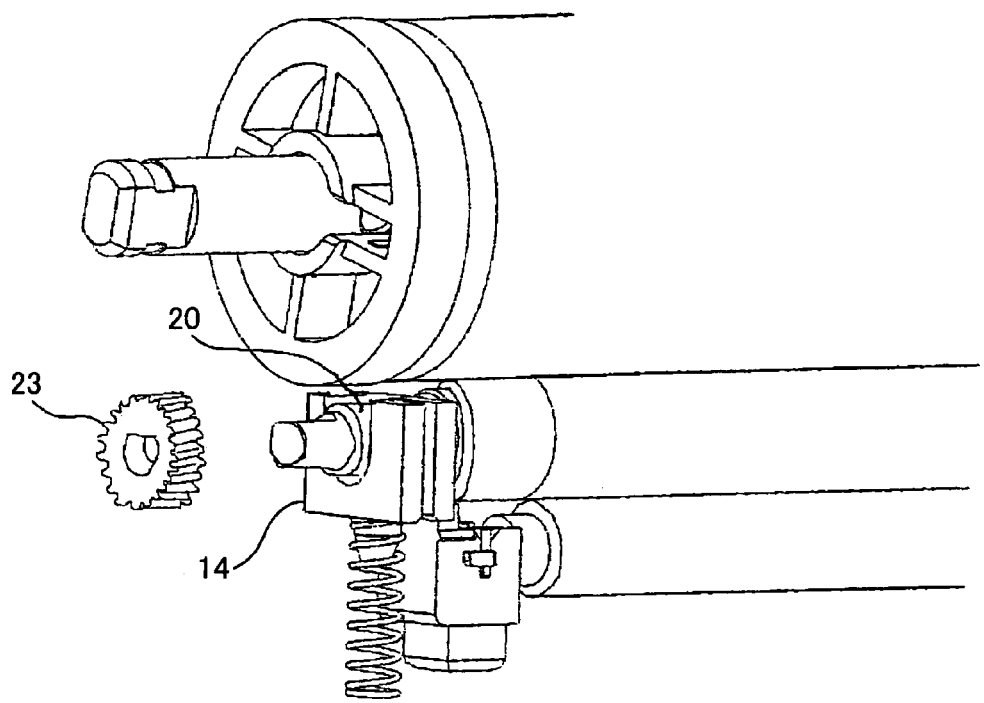
FIG. 7 is a perspective view of the shaft bearings of the photoconductor, the charging roller, and the charging roller cleaning roller illustrated in FIG. 3A, wherein a rotation shaft of the charging roller is driven via a collar.

As illustrated in FIG. 2, in the image forming apparatus 100 according to the present embodiment, the charging roller 17 and the charging roller cleaning roller 18 are placed below the photoconductor 21 and the development device 10. In this case, therefore, a development agent (i.e., developer) scattered from the development device 10 penetrates into the shaft bearing 14 for the charging roller 17 and the shaft bearing 15 for the charging roller cleaning roller 18. In recent years, developers have been increasingly reduced in size in pursuit of better image quality. With this tendency, scattering and resultant penetration of the developer into shaft bearings more frequently occur. As a result, in the present embodiment, for example, the shaft bearing 14 for the charging roller 17 is locked, and thus the surface of the photoconductor 21 is not uniformly charged. Thereby, an abnormal image is formed. In other cases, the shaft bearing 15 for the charging roller cleaning roller 18 is locked, and an abnormal image is formed due to uneven or insufficient charging of the photoconductor 21. Particularly, when carriers of an approximately 35 μm diameter penetrate the shaft bearing 14 for the charging roller 17, the friction resistance of the charging roller 17 with respect to shaft bearing 14 increases. Accordingly, the drive torque of the charging roller 17 increases, and the force of the charging roller 17 departing from the photoconductor 21 is increased due to a pressure angle of the gear 23. As a result, a gap between the charging roller 17 and the photoconductor 21 is not appropriately maintained but instead is increased, and the charging roller 17 fails to appropriately charge the photoconductor 21. As illustrated in FIG. 7, therefore, the shaft bearing 14 for receiving the rotation shaft 17a of the charging roller 17 is formed into a U-shape so that the rotation shaft 17a is driven via an oil-impregnated sintered collar 20. With this configuration, the developer is prevented from penetrating into a space between the rotation shaft 17a and the shaft bearing 14 and causing the increase in the drive torque of the charging roller 17. As a result, the image forming operation can be stably performed over time.

Figure 12:
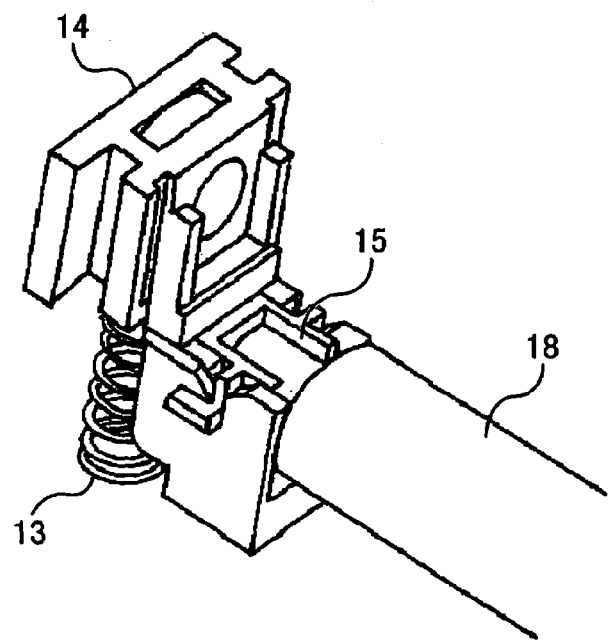
FIG. 12 is a perspective view of the charging roller cleaning roller attached to a U-shaped shaft bearing.

As illustrated in FIG. 6, the shaft bearing 15 for the charging roller cleaning roller 18 is also formed into a U-shape. FIG. 12 illustrates a perspective view of the charging roller cleaning roller 18 attached to the U-shaped shaft bearing 15. Alternatively, the shaft bearing 15 for the rotation shaft 18a of the charging roller cleaning roller 18 may be formed as a shaft bearing 40 illustrated in FIG. 15, which has a larger contact area in which the shaft bearing 40 contacts the rotation shaft 18a, and which is formed in a circle shape to prevent penetration of a foreign material into a space between the shaft bearing 40 and the rotation shaft 18a.

Figure 13:
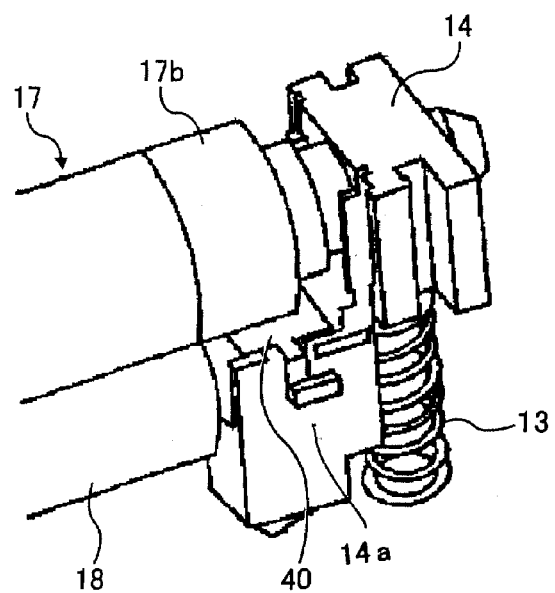
FIG. 13 is an enlarged perspective view of the shaft bearings for the charging roller and the charging roller cleaning roller.
Figure 14:
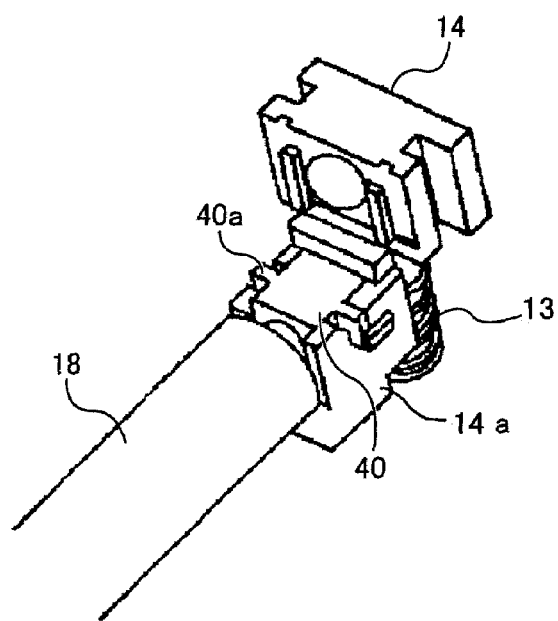
FIG. 14 is a perspective view of the charging roller cleaning roller attached to a circle-shaped shaft bearing.
Figure 15:
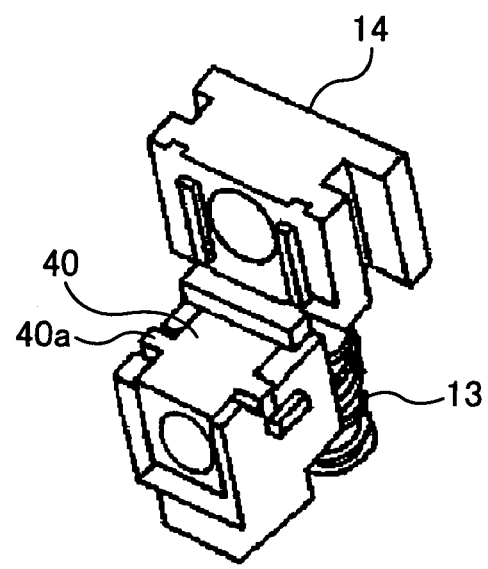
FIG. 15 is a schematic view of the circle-shaped shaft bearing illustrated in FIG. 14 attached to the shaft bearing of the charging roller.
Figure 16:
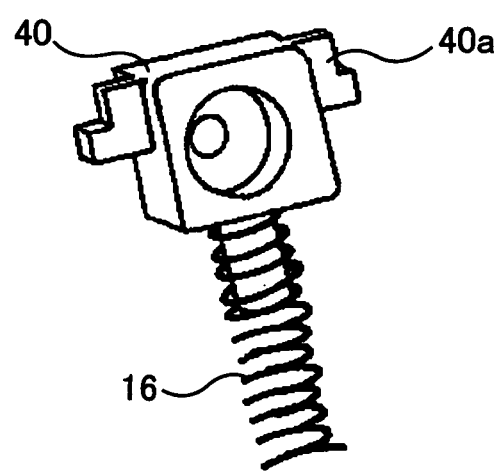
FIG. 16 is a schematic view of the circle-shaped shaft bearing illustrated in FIG. 14 and a spring.

The shaft bearing 40 is described more in detail with reference to FIGS. 13 to 16. FIG. 13 is an enlarged perspective view of the shaft bearing 14 for the charging roller 17 and the shaft bearing 40 for the charging roller cleaning roller 18. FIG. 14 is a perspective view of the charging roller cleaning roller 18 attached to the shaft bearing 40. FIG. 15 is a schematic view of the shaft bearing 40 attached to the shaft bearing 14 for the charging roller 17. FIG. 16 is a schematic view of the shaft bearing 40 and the spring 16. Similarly to FIGS. 5 and 6, the charging roller 17 is rotatably held by the shaft bearing 14, while the charging roller cleaning roller 18 is rotatably held by the shaft bearing 40. As illustrated in FIG. 16, the circle-shaped shaft bearing 40 for the rotation shaft 18a of the charging roller cleaning roller 18 is formed in a nested box having two protruding ribs 40a so that the shaft bearing 40 is held by the portion 14a of the shaft bearing 14, with the two protruding ribs 40a hung on the shaft bearing 14. The spring 16 is provided in a space between the shaft bearings 14 and 40. Thus configured, the shaft bearing 40 for the rotation shaft 18a of the charging roller cleaning roller 18 can slidingly move up and down with respect to the shaft bearing 14 for the rotation shaft 17a of the charging roller 17. Further, pressed by the spring 16, the portion of the shaft bearing 14 which holds the shaft bearing 40 applies pressure to the shaft bearing 40 which rotatably holds the rotation shaft 18a. Accordingly, the charging roller cleaning roller 18 is made contact the charging roller 17. Upon receipt of driving force from the photoconductor 21 via a gear (not illustrated), the charging roller cleaning roller 18 cleans the surface layer of the charging roller 17 of toner particles and so forth adhered thereto, while being rotated by friction force along with the rotation of the charging roller 17.

Specifically, when the circle-shaped shaft bearing 40 illustrated in FIGS. 13 to 16 is used, the charging roller 17 of an approximately 11.2 mm diameter is rotatably held by the shaft bearing 14, while the charging roller cleaning roller 18 of an approximately 8.5 mm diameter is rotatably held by the shaft bearing 40. Each of the two shaft bearings 40 provided for the opposite ends of the charging roller cleaning roller 18 is applied with pressure of approximately 600 mN by the spring 16. The contact force (i.e., linear velocity pressure) of the charging roller cleaning roller 18 made of melamine resin foam with respect to the charging roller 17 is set to be approximately 36.8 mN/cm. The charging roller cleaning roller 18 is made of melarnine resin foam having a compression rate of approximately 3.0%, and a weight of the charging roller cleaning roller 18 is approximately 357 mN including the weight of a cored bar thereof. Further, the contact width of the charging roller cleaning roller 18 with respect to the charging roller 17 is set to be approximately 22.9 cm.

Figure 18:
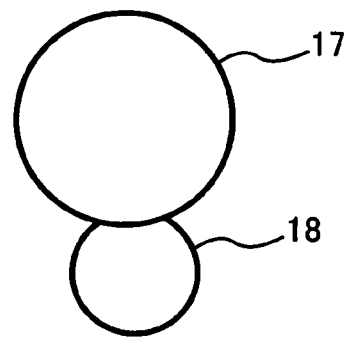
FIG. 18 is a diagram illustrating the charging roller cleaning roller deformed and failing to rotate along with rotation of the charging roller.

The charging roller cleaning roller 18 needs to be made contact the charging roller 17 with such contact pressure which does not permanently deform the melamine resin foam of the charging roller cleaning roller 18. As described above, the contact pressure is set to be 50 mN/cm or the less. As illustrated in FIG. 18, if the contact pressure exceeds 50 mN/cm, the compressed melamine resin foam forming the charging roller cleaning roller 18 is deformed at an area contacting the charging roller 17. Thus, the deformed charging roller cleaning roller 18 may stay deformed, failing to rotate along with the rotation of the charging roller 17. If the charging roller cleaning roller 18 is prevented from rotating, the charging roller cleaning roller 18 may unnecessarily grind parts of the surface of the charging roller 17 due to its relatively high grinding force, and thus the surface of the charging roller 17 may be scraped off and damaged. This phenomenon tends to occur particularly under a relatively hot and humid environment. In consideration of the above, an experiment was conducted to examine the rotation of the charging roller cleaning roller 18 along with the rotation of the charging roller 17, after the melamine resin foam of the charging roller cleaning roller 18 has been deformed after exposure under a temperature of approximately 43 degrees Celsius and a humidity of approximately 80% for ten days. If each of the two shaft bearings 40 provided for the opposite ends of the charging roller cleaning roller 18 is applied with pressure of approximately 700 mN by the spring 16, the contact pressure of the charging roller cleaning roller 18 applied to the charging roller 17 is approximately 45.5 mN/cm. Meanwhile, if each of the two shaft bearings 40 is applied with pressure of approximately 800 mN by the spring 16, the contact pressure of the charging roller cleaning roller 18 applied to the charging roller 17 is approximately 54.3 mN/cm. The experiment reveals that, if the contact pressure applied by the spring 16 to each of the two shaft bearings 40 is approximately 600 mN or approximately 700 mN, the charging roller cleaning roller 18 can rotate along with the rotation of the charging roller 17, even after exposure under the temperature of approximately 43 degrees Celsius and the humidity of approximately 80% for ten days. If the contact pressure applied by the spring 16 to each of the two shaft bearings 40 is approximately 800 mN, however, rotating movement of the charging roller cleaning roller 18 along with the rotation of the charging roller 17 is unstable. It is revealed from the experiment that approximately 50 mN/cm is the contact pressure of the charging roller cleaning roller 18 which does not cause defective rotating movement of the charging roller cleaning roller 18 triggered by deformation of the melamine resin foam thereof.

In the present example, an outer diameter of the rotation shaft 18a of the charging roller cleaning roller 18 is set to be approximately 4 mm, and a width in a thrust direction of the shaft bearing 40 receiving the rotation shaft 18a is set to be approximately 3 mm (approximately 2 mm to approximately 4 mm, if a thrust gutter is included). Further, the contact area of the rotation shaft 18a contacting the shaft bearing 40 (i.e., a lower cylindrical surface) is set to be approximately 18.9 mm$^2$, and surface pressure of the shaft bearing 40 is set to be approximately 22.3 mN/mm$^2$.

Figure 17:
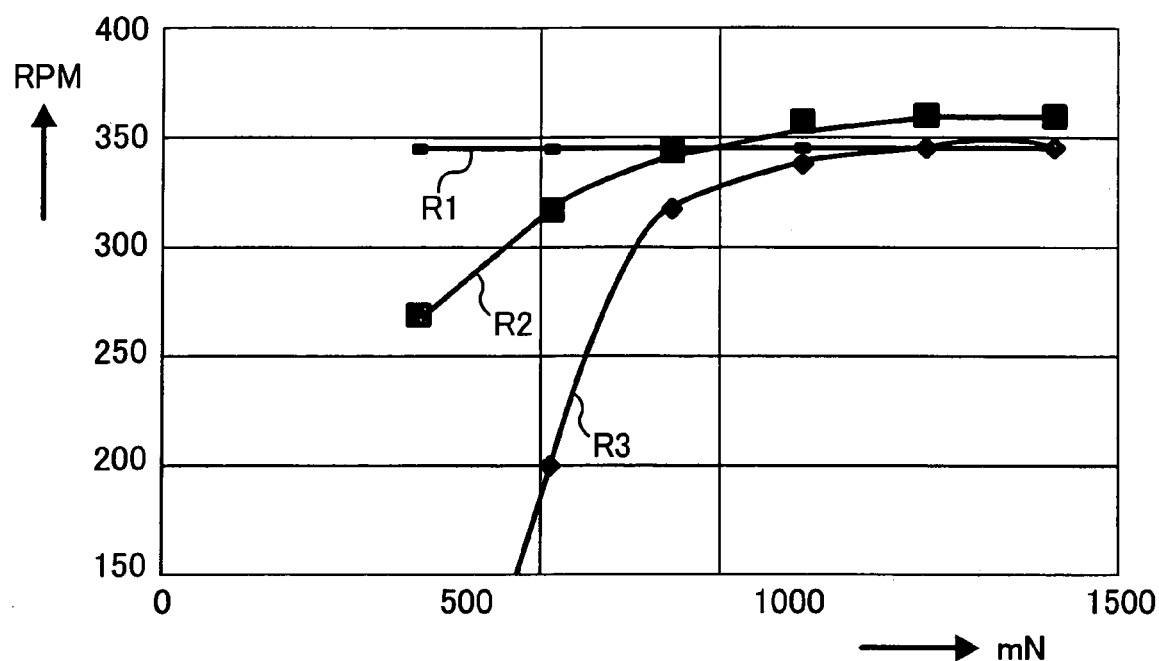
FIG. 17 is a graph indicating changes in the number of rotations of the charging roller cleaning roller with respect to pressure applied to the shaft bearing thereof.

To cause the charging roller cleaning roller 18 to appropriately rotate along with the rotation of the charging roller 17, the charging roller cleaning roller 18 needs to contact the charging roller 17 with such contact pressure that makes friction torque between the charging roller 17 and the charging roller cleaning roller 18 greater than friction torque of the charging roller cleaning roller 18 with respect to the shaft bearing 40. The graph in FIG. 17 represents rotation performance of the charging roller cleaning roller 18 represented by the number of rotations thereof, with different pressures applied to each of the U-shaped shaft bearing 15 (R3) and the circle-shaped shaft bearing 40 (R2). The number of rotations of the charging roller cleaning roller 18 was measured by reviewing images of the surface of the charging roller cleaning roller 18 recorded by a high-speed camera. R1 in FIG. 17 indicates the number of rotations of the charging roller cleaning roller 18 with which surface linear velocity of the charging roller cleaning roller 18 is theoretically equal with surface linear velocity of the charging roller 17. It is observed from FIG. 17 that, if the contact pressure of the charging roller cleaning roller 18 applied to the charging roller 17 is increased, the linear velocity of the charging roller cleaning roller 18 approaches the linear velocity of the charging roller 17. It is now assumed that the pressure applied by the spring 16 is approximately 600 mN, the linear pressure of the charging roller cleaning roller 18 is approximately 36.7 mN/cm, and the circle-shaped shaft bearing 40 is used. Then, it is observed from FIG. 17 that the number of rotations of the charging roller cleaning roller 18 is approximately 300 rpm (revolutions per minute). It is thus found that, with relatively low contact pressure applied, the charging roller cleaning roller 18 rotates along with the rotation of the charging roller 17 more stably in a case in which the circle-shaped shaft bearing 40 is used than in a case in which the U-shaped shaft bearing 15 is used. It was also found from the experiment that the upper limit of the pressure applied by the spring 16 is approximately 800 mN in consideration of undesirable deformation occurring when the pressure exceeds approximately 800 mN. This upper limit of the pressure applied by the spring 16 varies depending on the thickness and compression rate of the melamine resin foam. If the compression rate of the melamine resin foam is increased and the thickness of the melamine resin foam is decreased, the melamine resin foam is less likely to be deformed. Therefore, the upper limit of the pressure applied by the spring 16 becomes a relatively high value. The upper limit of the pressure applied by the spring 16 further varies depending on how the pressure is applied. If the image forming apparatus 100 is configured such that the charging roller cleaning roller 18 applies, from above, the contact pressure to the charging roller 17 by using weight thereof, the charging roller cleaning roller 18 rotates along with the rotation of the charging roller 17 with no load posed on the shaft bearing. In this case, therefore, the upper and lower limits of the pressure applied by the spring 16 are different from those in the present example.

In the present embodiment, the thickness and the compression rate of the melamine resin foam are set to be approximately 1.5 mm and approximately 30%, respectively. If the compression rate of the melamine resin foam is substantially increased, manufacturing costs including material cost increase. Meanwhile, if the compression rate of the melamine resin foam is substantially decreased, the foam size is too large to have sufficient cleaning ability. In view of this, the melamine resin foam having the compression rate of approximately 30% is relatively well-balanced between cost and performance and therefore used in the present example. Further, a calcination temperature of the compressed melamine resin foam is set to be in the range of approximately 200 degrees Celsius to approximately 300 degrees Celsius so that the compressed melamine resin foam layer is prevented from swelling.

Figure 9:
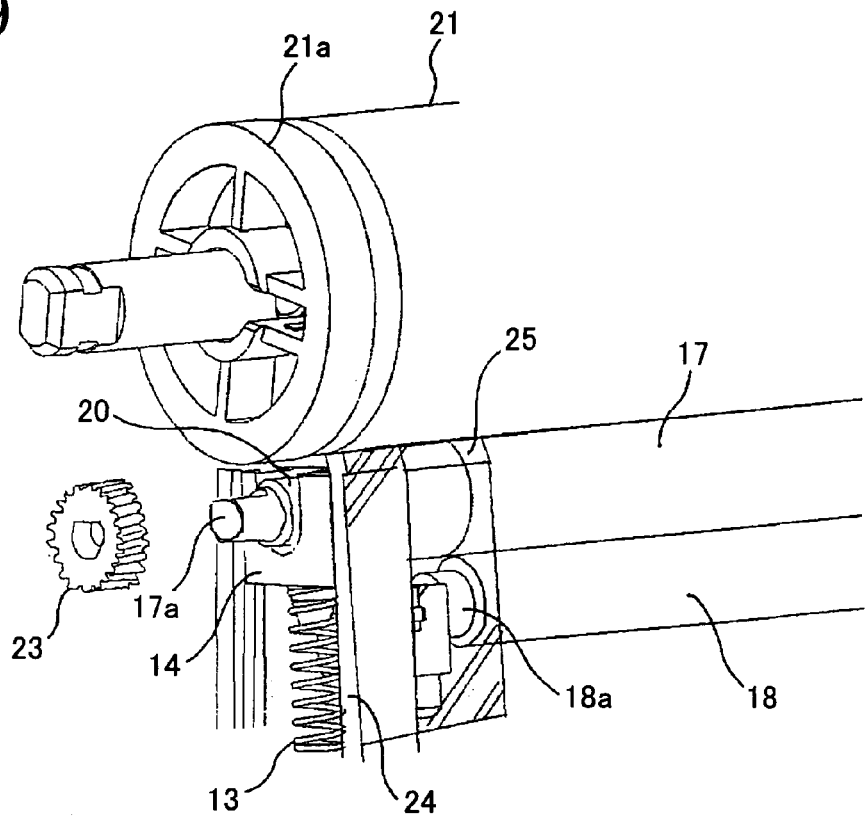
FIG. 9 is a schematic perspective view of the shaft bearings of the photoconductor, the charging roller, and the charging roller cleaning roller illustrated in FIG. 7, wherein a cover is provided on a frame guide which holds shaft bearing.

The developer dropped from the development device 10 may also adhere to the gap rollers 17b, and thus the gap between the charging roller 17 and photoconductor 21 may not be kept at an appropriate value but may be increased. Particularly, if even a small amount of carrier adheres to the gap rollers 17b, the gap rollers 17b may seriously wear the surface of the photoconductor 21. In view of this, as illustrated in FIG. 9, a cover 25 is provided to the frame guide 24 which covers and holds the shaft bearing 14. Adhered to the frame guide 24 and formed by a PET (polyethylene terephthalate) sheet, the cover 25 prevents the developer including carrier scattered from the development device 10 from adhering the shaft bearing 14, the rotation shaft 17a, the gap rollers 17b, and so forth.

Figure 10:
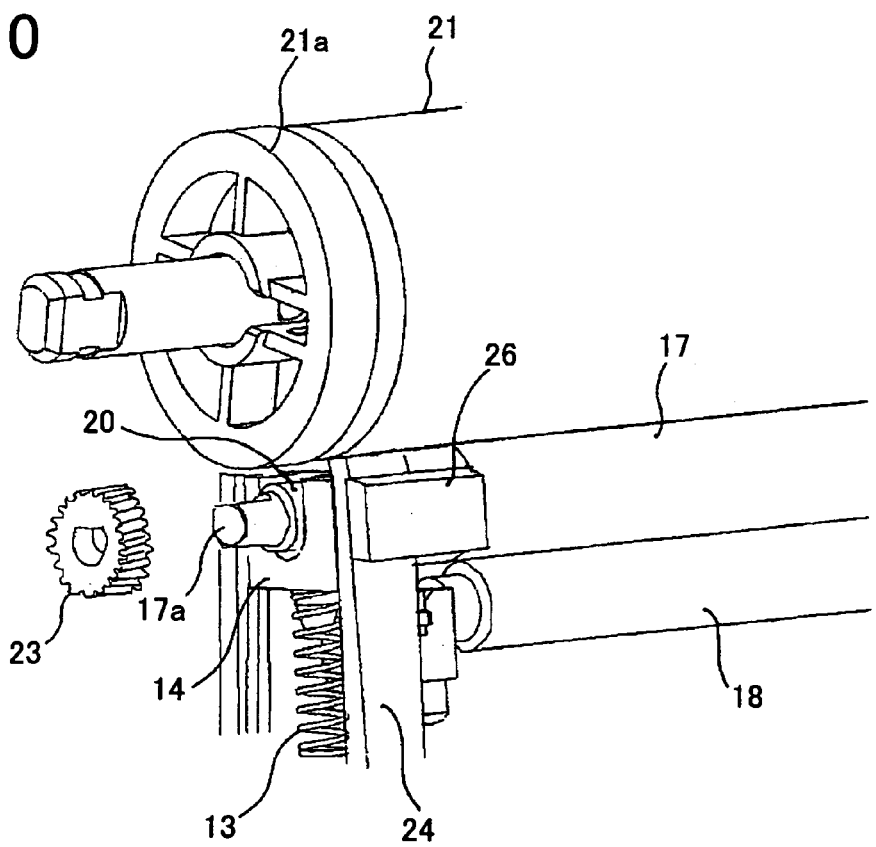
FIG. 10 is a schematic perspective view of the shaft bearings of the photoconductor, the charging roller, and the charging roller cleaning roller illustrated in FIG. 7, wherein a magnet is provided on the frame guide which holds shaft bearing.

Alternatively, as illustrated in FIG. 10, a magnet 26 may be adhered to the frame guide 24 which covers and holds the shaft bearing 14 so that the magnet 26 catches the carrier scattered from the development device 10. With this configuration, adhesion of the carrier to the gap rollers 17b and resultant wearing of the photoconductor 21 can be prevented with greater assurance. The magnet 25 further prevents carrier which has escaped from an end of the cleaning blade 33 from adhering the gap rollers 17b.

Figure 11:
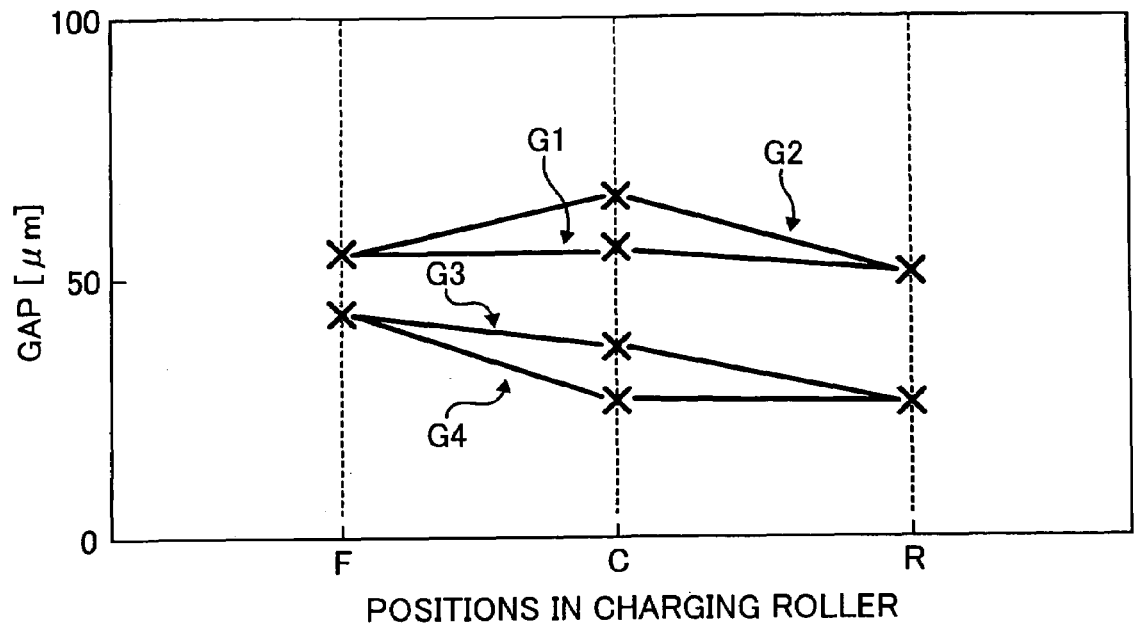
FIG. 11 is a graph indicating deviations in gap between the photoconductor and the charging roller in a longitudinal direction.

In a case of proximity-charging in which the photoconductor 21 is charged with a minute gap kept between the photoconductor 21 and the charging roller 17, variations in gap size in a longitudinal direction of the charging roller 17 need to be reduced to prevent uneven charging of the photoconductor 21. To maintain the minute gap, the gap rollers 17b are respectively provided at the opposite ends of the charging roller 17, as described above. In the lower-arrangement, however, the minute gap is unlikely to be appropriately maintained at around a central area of the charging roller 17 in the longitudinal direction thereof due to the weight of the charging roller 17. Meanwhile, according to the present embodiment, in the entire area of the charging roller 17 extending in the longitudinal direction thereof, the charging roller cleaning roller 18 is made to contact the charging roller 17 applied with appropriate pressure from underneath, while the gap rollers 17b provided at the opposite ends of the charging roller 17 appropriately maintaining the minute gap between the charging roller 17 and the photoconductor 21. Accordingly, the minute gap can be maintained within a predetermined value range even in the central area of the charging roller 17 in the longitudinal direction thereof. FIG. 11 is a graph indicating variations in size of the gap between the charging roller 17 and the photoconductor 21 measured for a case in which the charging roller cleaning roller 18 is pressed from underneath to contact the charging roller 17 (i.e., G1 and G4) and for a case in which the charging roller cleaning roller 18 is not pressed from underneath to contact the charging roller 17 (i.e., G2 and G3). G1 and G2 indicate the maximum gap sizes obtained in the respective cases, while G3 and G4 indicate the minimum gap sizes obtained in the respective cases. The gap was measured at a center position (C) and opposite end positions (F and R) of the charging roller 17 in the longitudinal direction thereof. The positions F and R respectively indicate front and rear positions in the image forming apparatus 100. Members such as an operation panel are located at the front side of the image forming apparatus 100, while members such as an exhaust fan are provided at the read side thereof. The gap was measured by an optical laser measuring system. As illustrated in FIG. 11, when the charging roller 17 is not pressed by the charging roller cleaning roller 18, the gap size set to a predetermined value at the opposite ends of the charging roller 17 substantially changes at the center of the charging roller 17. Meanwhile, when the charging roller 17 is pressed by the charging roller cleaning roller 18, the gap size set to the predetermined value is almost appropriately maintained both at the center and at the opposite ends of the charging roller 17.

As described above, the charging roller cleaning roller 18 contacts the charging roller 17, with the shaft bearing 15 for the charging roller cleaning roller 18 being movably held via the spring 16 in the direction in which the charging roller cleaning roller 18 approaches and separates from the charging roller 17. With this configuration, the load posed on the contact area of the charging roller cleaning roller 18 with the charging roller 17 is reduced, and thus the charging roller 17 continues to be cleaned by the charging roller cleaning roller 18. As a result, the charging roller 17 can stably perform the charging operation over a relatively long time.

Further, with the contact force of the charging roller cleaning roller 18 to the charging roller 17 being set within the range of approximately 15 mN/cm to approximately 50 mN/cm, the charging roller cleaning roller 18 can stably rotate along with the rotation of the charging roller 17 for a relatively long time. If the contact force of the charging roller cleaning roller 18 to the charging roller 17 exceeds approximately 50 mN/cm, the charging roller cleaning roller 18 may be deformed at the contact area of the charging roller cleaning roller 18 with the charging roller 17. Further, the friction load posed by the rotation shaft 18a on the shaft bearing 15 may increase, deteriorating rotation of the charging roller cleaning roller 18 along with the rotation of the charging roller 17. On the other hand, if the contact force of the charging roller cleaning roller 18 to the charging roller 17 does not reach approximately 15 mN/cm, the roughness of the surface of the charging roller cleaning roller 18 causes the charging roller cleaning roller 18 to unevenly contact the surface of the charging roller 17. As a result, the cleaning performance of the charging roller cleaning roller 18 is deteriorated.

Further, with the contact area of the shaft bearing 15 with the rotation shaft 18a being set in the range of approximately 3 $mm^2$ to approximately 20 $mm^2$, the charging roller cleaning roller 18 can stably rotate along with the rotation of the cleaning roller 17 for a relatively long time. If the contact area exceeds approximately 20 $mm^2$, the friction resistance of the rotation shaft 18a increases. As a result, the friction coefficient μ of the charging roller 17 and the charging roller cleaning roller 18 decreases. Further, when a foreign material such as carrier and toner penetrates in the shaft bearing 14 or 15, the shaft bearing 14 or 15 are likely to be locked.

Further, the surface of the charging roller cleaning roller 18 is made of melamine resin foam. Therefore, the decrease in the friction coefficient μ due to the lubricant coated over the surface of the photoconductor 21 can be reduced. Accordingly, the charging roller cleaning roller 18 can stably rotate along with the rotation of the cleaning roller 17 for a relatively long time.

Further, with the compression rate of the melamine resin foam being set in the range of approximately 20% to approximately 50%, the charging roller cleaning roller 18 can evenly clean the surface of the charging roller 17.

Further, the surface of the charging roller cleaning roller 18 is embedded with microfibers derived from the dividable composite fibers. Therefore, the decrease in the friction coefficient μ due to the lubricant coated over the surface of the photoconductor 21 can be reduced, and the charging roller cleaning roller 18 can stably rotate along with the rotation of the cleaning roller 17 for a relatively long time.

Further, the rotation shaft 17a of the charging roller 17 is provided with the oil-impregnated sintered collar 20 so that the rotation shaft 17a is rotatable via the collar 20. With this configuration, penetration of the developer in the space between the rotation shaft 17a and the shaft bearing 14 and resultant increase in the torque of the charging roller 17 can be prevented. As a result, the image forming operation can be stably performed for a relatively long time.

Further, the cover 25 is provided to the frame guide 24 which holds the shaft bearing 14 for the rotation shaft 17a so that the shaft bearing 14 is covered by the cover 25. With this configuration, the developer, such as carrier, scattered from the development device 10 can be prevented from adhering the shaft bearing 14, the rotation shaft 17a, the gap rollers 17b, and so forth.

Alternatively, the frame guide 24 may be provided with the magnet 27. With this configuration, the carrier scattered from the development device 10 can be prevented from adhering the shaft bearing 14, the rotation shaft 17a, the gap rollers 17b, and so forth.

The charging roller 17 is provided with the gap rollers 17b so that the charging roller 17 charges the surfaces of the photoconductor 21 with a minute gap maintained between the charging roller 17 and the photoconductor 21. Since the charging roller 17 is pressed by the charging roller cleaning roller 18 from underneath, the set gap size is almost appropriately maintained both at the center and the opposite end positions of the charging roller 17 in the longitudinal direction thereof. Therefore, the charging roller 17 can evenly charge the photoconductor 21.

Further, the circle-shaped shaft bearing 40 may be provided for receiving the rotation shaft 18a. With this configuration, the contact area of the shaft bearing 40 with the rotation shaft 18a is increased, and a foreign material is prevented from penetrating into the space between the rotation shaft 18a and the shaft bearing 40. Accordingly, the charging roller cleaning roller 18 can more stably rotate along with the rotation of the charging roller 17 for a relatively long time.

Further, the charging roller cleaning roller 18 rotates along with the rotation of the charging roller 17 and contacts the charging roller 17 with the contact force which does not permanently deform the charging roller cleaning roller 18. Accordingly, the charging roller cleaning roller 18 can stably rotate along with the rotation of the charging roller 17.

Further, in the image forming apparatus 100 described above, the photoconductor 21, the charging roller 17, and the charging roller cleaning roller 18 are integrally provided in a process cartridge. Therefore, maintenance of the components forming the image forming apparatus 100 can be performed with relative ease.

The above-described embodiments are illustrative, and numerous additional modifications and variations are possible in light of the above teachings. For example, elements and/or features of different illustrative and exemplary embodiments herein may be combined with each other and/or substituted for each other within the scope of this disclosure and appended claims. It is therefore to be understood that within the scope of the appended claims, the disclosure of this patent specification may be practiced otherwise than as specifically described herein.

The invention claimed is:

1. An image forming apparatus comprising:
   an image carrying member;
   a charging roller configured to charge the image carrying member;
   a charging roller cleaning roller configured to contact and clean a surface of the charging roller;
   a first shaft bearing configured to rotatably hold a rotation shaft of the charging roller cleaning roller; and
   a second shaft bearing configured to rotatably hold a rotation shaft of the charging roller, the second shaft bearing integrally including a first shaft-bearing holding member configured to movably hold, with use of a resilient member, the first shaft bearing in a direction of moving the charging roller close to and apart from the charging roller cleaning roller.

2. The image forming apparatus as described in claim 1, wherein contact force of the charging roller cleaning roller relative to the charging roller is in an approximate range of from 15 mN/cm to 50 mN/cm.

3. The image forming apparatus as described in claim 2, wherein contact area of the rotation shaft of the charging roller cleaning roller with the first shaft bearing is in an approximate range of from 3 mm$^2$ to 20 mm$^2$.

4. The image forming apparatus as described in claim 3, wherein the charging roller cleaning roller has a surface made of melamine resin foam.

5. The image forming apparatus as described in claim 4, wherein the surface of the charging roller cleaning roller has a compression rate in an approximate range of from 20% to 50%.

6. The image forming apparatus as described in claim 3, wherein the charging roller cleaning roller has a surface embedded with microfibers.

7. The image forming apparatus as described in claim 6, wherein the rotation shaft of the charging roller includes an oil-impregnated sintered collar such that the rotation shaft of the charging roller is rotatable via the collar.

8. The image forming apparatus as described in claim 7, further comprising:
   a second shaft bearing holding member configured to hold the second shaft bearing; and
   a cover configured to cover the second shaft bearing holding member.

9. The image forming apparatus as described in claim 7, further comprising:
   a second shaft bearing holding member configured to hold the second shaft bearing; and
   a magnet adhered to the second shaft bearing holding member.

10. The image forming apparatus as described in claim 9, wherein the charging roller comprises minute-gap maintaining members configured to maintain a minute gap between the charging roller and the image carrying member.

11. The image forming apparatus as described in claim 1, wherein the first shaft bearing is formed into a circle-shape.

12. The image forming apparatus as described in claim 11, wherein the charging roller cleaning roller is configured to rotate along with rotation of the charging roller, and to contact the charging roller with contact force which does not permanently deform the charging roller cleaning roller.

13. An image forming apparatus comprising:
   image carrying means;
   charging means for charging the image carrying means;
   charge cleaning means for contacting and cleaning a surface of the charging means;
   first shaft bearing means for rotatably holding rotation shaft means of the charge cleaning means; and
   second shaft bearing means for rotatably holding rotation shaft means of the charging means, the second shaft bearing means integrally including a first shaft bearing means holding means for movably holding, with use of resilient means, the first shaft bearing means in a direction of moving the charging means close to and apart from the charge cleaning means.

14. A process cartridge attachable to and detachable from an image forming apparatus, the process cartridge integrally comprising:
   an image carrying member;

a charging roller configured to charge the image carrying member;

a charging roller cleaning roller configured to contact and clean a surface of the charging roller;

a first shaft bearing configured to rotatably hold a rotation shaft of the charging roller cleaning roller; and a second shaft bearing configured to rotatably hold a rotation shaft of the charging roller, the second shaft bearing integrally including a first shaft bearing holding member configured to movably hold, with use of a resilient member, the first shaft bearing in a direction of moving the charging roller close to and apart from the charging roller cleaning roller.

15. The process cartridge as described in claim 14, wherein contact force of the charging roller cleaning roller relative to the charging roller is in an approximate range of from 15 mN/cm to 50 mN/cm.

16. The process cartridge as described in claim 15, wherein contact area of the rotation shaft of the charging roller cleaning roller with the first shaft bearing is in an approximate range from of 3 $mm^2$ to 20 $mm^2$.

17. The process cartridge as described in claim 16, wherein the charging roller cleaning roller has a surface made of melamine resin foam.

18. The process cartridge as described in claim 17, wherein the surface of the charging roller cleaning roller has a compression rate in an approximate range of from 20% to 50%.

19. The process cartridge as described in claim 16, wherein the charging roller cleaning roller has a surface embedded with microfibers.

20. The process cartridge as described in claim 19, wherein the rotation shaft of the charging roller includes an oil-impregnated sintered collar such that the rotation shaft of the charging roller is rotatable via the collar.

21. The process cartridge as described in claim 20, further comprising:

a second shaft bearing holding member configured to hold the second shaft bearing; and a cover configured to cover the second shaft bearing holding member.

22. The process cartridge as described in claim 20, further comprising:

a second shaft bearing holding member configured to hold the second shaft bearing; and a magnet adhered to the second shaft bearing holding member.

23. The process cartridge as described in claim 22, wherein the charging roller comprises minute-gap maintaining members configured to maintain a minute gap between the charging roller and the image carrying member.

24. The process cartridge as described in claim 14, wherein the first shaft bearing is formed into a circle-shape.

25. The process cartridge as described in claim-24, wherein the charging roller cleaning roller is configured to rotate along with rotation of the charging roller, and to contact the charging roller with contact force which does not permanently deform the charging roller cleaning roller.

26. A process cartridge attachable to and detachable from an image forming apparatus, the process cartridge integrally comprising:

image carrying means;

charging means for charging the image carrying means;

charge cleaning means for contacting and cleaning a surface of the charging means;

first shaft bearing means for rotatably holding rotation shaft means of the charge cleaning means; and second shaft bearing means for rotatably holding rotation shaft means of the charging means, the second shaft bearing means integrally including first shaft bearing means holding means for movably holding, with use of resilient means, the first shaft bearing means in a direction of moving the charging means close to and apart from the charge cleaning means.

27. A charging device comprising:

a charging roller;

a charging roller cleaning roller configured to contact and clean a surface of the charging roller;

a first shaft bearing configured to rotatably hold a rotation shaft of the charging roller cleaning roller; and a second shaft bearing configured to rotatably hold a rotation shaft of the charging roller, the second shaft bearing integrally including a first shaft-bearing holding member configured to movably hold, with use of a resilient member, the first shaft bearing in a direction of moving the charging roller cleaning roller close to and apart from the charging roller.

28. The charging device as described in claim 27, wherein a contact force of the charging roller cleaning roller relative to the charging roller is in an approximate range of from 15 mN/cm to 50 mN/cm.

29. The charging device as described in claim 28, wherein a contact area of the rotation shaft of the charging roller cleaning roller with the first shaft bearing is in an approximate range of from 3 $mm^2$ to 20 $mm^2$.

30. The charging device as described in claim 29, wherein the charging roller cleaning roller has a surface made of melamine resin foam.

31. The charging device as described in claim 30, wherein the surface of the charging roller cleaning roller has a compression rate in an approximate range of from 20% to 50%.

32. The charging device as described in claim 29, wherein the charging roller cleaning roller has a surface embedded with microfibers.

33. The charging device as described in claim 32, wherein the rotation shaft of the charging roller includes an oil-impregnated sintered collar such that the rotation shaft of the charging roller is rotatable via the collar.

34. The charging device as described in claim 33, further comprising:

a second shaft bearing holding member configured to hold the second shaft bearing; and a cover configured to cover the second shaft bearing holding member.

35. The charging device as described in claim 33, further comprising:

a second shaft bearing holding member configured to hold the second shaft bearing; and a magnet adhered to the second shaft bearing holding member.

36. The charging device as described in claim 35, wherein the charging roller comprises minute-gap maintaining members configured to maintain a minute gap between the charging roller and the image carrying member.

37. The charging device as described in claim 27, wherein the first shaft bearing is formed into a circle-shape.

38. The charging device as described in claim 37, wherein the charging roller cleaning roller is configured to rotate along with rotation of the charging roller, and to contact the charging roller with a contact force which does not permanently deform the charging roller cleaning roller.

* * * * *